United States Patent [19]

Zametzer et al.

[11] Patent Number: 5,220,679
[45] Date of Patent: Jun. 15, 1993

[54] TRANSMISSION-RECEPTION DIPLEXER HAVING A DIODE RF SWITCH

[75] Inventors: Klaus Zametzer, Forchheim; Markus Vester, Erlangen, both of Fed. Rep. of Germany

[73] Assignee: Siemens Aktiengesellschaft, Munich

[21] Appl. No.: 687,019

[22] Filed: Apr. 18, 1991

[30] Foreign Application Priority Data

May 23, 1990 [DE] Fed. Rep. of Germany ....... 4016641

[51] Int. Cl.⁵ ............................................. H04B 1/44
[52] U.S. Cl. ...................................... 455/78; 455/82; 455/83
[58] Field of Search ........................ 455/83, 78, 80, 82, 455/129, 280, 281, 292

[56] References Cited

U.S. PATENT DOCUMENTS 5,047,674 9/1991 Clark et al. ........................... 455/78

FOREIGN PATENT DOCUMENTS 2426506 12/1975 Fed. Rep. of Germany .
2598051 10/1987 France .................................. 455/83

OTHER PUBLICATIONS

"Rundfunksender als Energiequelle", radio fernseh phon praxis, No. 3, 1971, p. 80.
Kesel et al., "Signalverarbeitende Dioden", Springer-Verlag, Berlin, Heidelberg, New York, 1982, pp. 121–122.

Primary Examiner—Reinhard J. Eisenzopf
Assistant Examiner—Nguyen Vo
Attorney, Agent, or Firm—Hill, Steadman & Simpson

[57] ABSTRACT

In a transmitting-receiving diplexer having a transmitting channel for forwarding a radio-frequency transmission signal to an antenna connectible to an antenna terminal and having a receiving channel for forwarding a signal received from the antenna to a receiver, at least one diode is provided in the receiving channel as an RF switch. A rectifier is connected to the transmitting channel and to the diode or diodes of the RF switch, the rectifier generating a blocking voltage required for blocking the receiving channel during transmission of the transmission signal. Further, a control switch is provided that disconnects the blocking voltage from the diode or diodes of the RF switch during reception.

3 Claims, 2 Drawing Sheets

TRANSMISSION-RECEPTION DIPLEXER HAVING A DIODE RF SWITCH

BACKGROUND OF THE INVENTION

1. Field of the Invention

The present invention relates to a transmission-reception diplexer having a transmission channel for forwarding radio-frequency transmission signals onto an antenna which is connectible to an antenna terminal and having a receiving channel for forwarding a signal received from the antenna to a receiver, whereby at least one diode is provided in the receiving channel as a radio-frequency (RF) switch.

2. Description of the Prior Art

Transmission-receiving diplexers are used in order to alternatively connect a transmitter and a receiver to an antenna. A transmitting-receiving diplexer therefore represents nothing more than an antenna switch and electrically corresponds to a mechanical switch-over device.

A transmitting-receiving diplexer of the type initially set forth is described in the book by Erich Renz, "PIN und Schottky-Dioden", Heidelberg 1976, pp. 121–122. The diode in the receiving channel is biased either in the conducting direction or the non-conducting direction by a DC voltage. High requirements are therefore made of the diode in the receiving channel. First of all, the diode must keep the relatively-powerful transmission signal away from the receiver. Secondly, a relatively weak received signal in the receiving mode must be forwarded from the antenna to the receiver with optimally little attenuation. For inhibiting the receiving channel, the inhibiting DC voltage must be at least as high as the amplitude of the transmission voltage. Producing the inhibit voltage is not discussed in greater detail in the aforementioned reference.

U.S. Pat. No. 4,673,831, fully incorporated herein by this reference, proposes a number of circuits for radio-frequency switches having diodes that require an extremely-low energy for inhibiting or conducting. With these circuits, however, it is not possible to block higher powers because the PIN diodes employed have high off-state power losses. In one version, an inhibit voltage from an external voltage source is applied to the diodes therein in order to achieve a faster switching and a better separation.

SUMMARY OF THE INVENTION

It is therefore the object of the present invention to provide a transmitting-receiving diplexer that does not require a separate power pack portion for generating the inhibit voltage for the diode in the receiving channel.

The above object is achieved, according to the present invention, in that a rectifier is connected to the transmitting channel and to the diode or the diodes, the rectifier generating the inhibit voltage needed for inhibiting the receiving channel from the transmission signal during transmission, and in that a control switch is provided that disconnects the inhibit voltage from the diode or the diodes during receiving.

A separate blocking voltage rectifier is therefore eliminated. This is particularly advantageous for transmitting-receiving diplexers in nuclear magnetic resonance tomography systems, since it is not necessary then to feed a high-voltage line into a patient room.

An advantageous embodiment of the invention is characterized in that at least one threshold circuit that prevents an attenuation of the received signal by the rectifier is arranged in the transmitting channel between the antenna terminal and the terminal of the rectifier. The received signal that is already a low-power signal is therefore not additionally attenuated by the rectifier.

A particularly advantageous embodiment is characterized in that the rectifier is constructed as a voltage multiplier and that each stage of the voltage multiplier is connected to the transmitting channel via a voltage divider. As a result thereof, the off-stage power losses in the rectifier diodes are keep within reasonable limits, given extremely high-frequency transmission signals in the range above approximately 30 MHz.

In order to keep the attenuation of the transmission signal due to the voltage divider low, the voltage dividers constructed in accordance with further advantageous developments and features of the invention are fashioned as capacitive voltage dividers.

For generating extremely high DC voltages, it is advantageous for the dimensioning of the filter capacitors when, in accordance with a further development and feature of the invention, the DC voltage of a single stage is referred to the reference potential and the DC voltages of all stages add up to form the overall voltage.

Since the full blocking voltage is available only after a time delay after the beginning of the transmission, the RF switch in the receiving channel in a further advantageous development and feature of the invention contains two opposite polarity serially-connected diodes whose junction is connection to the rectifier via a controlled switch. It is therefore assured that the RF switch is a self-inhibiting switch at the first moment of transmission, accepting high losses. The power dissipated is thereby absorbed by the heat capacity of the diodes. After the full blocking voltage has been built up, the off-state power losses in the diodes are greatly reduced.

In accordance with a further specific embodiment of the invention, the invention is particularly characterized in that the opposite polarity serially-connected diodes have their cathodes connected to one another and in that the rectifier supplies a positive blocking voltage. In conjunction with generating the control current for the diodes, a favorable circuit structure is thereby achieved.

As the diodes, PIN diodes are utilized in the RF switch in accordance with another advantageous development and feature of the invention. The PIN diodes are particularly suited for utilization in RF diode switches because they have a low insertion attenuation in the on state and have a high value of insulating attenuation in the off state.

In accordance with another advantageous feature and development of the invention, the diodes of the anti-serial diodes are connected to coupling capacitors for decoupling the low, constant DC voltage required for activating the PIN diodes from the antenna and from the receiver.

In order to have respective identical portions of the transmission voltage drop off at the anti-serial diodes in the RF switch, when inhibiting, a filter element composed of a series circuit of an inductor and a capacitor is connected in parallel to the PIN diode of the antenna side in another advantageous development and feature of the invention and a further, identical filter element is connected between the junction of the two PIN diodes and the reference potential. The inductor is thereby connected to the junction and the capacitor to the reference potential and the rectifier is connected via the switch to the junction of an inductor and capacitor of the second filter element.

In accordance with a further advantageous development and feature of the invention, the invention is characterized in that a control current can be supplied via a respective inductor to the cathodes of the diodes in the RF switch for conducting upon reception. This circuit structure simultaneously makes it unnecessary to highly reverse charge the coupling capacitors at the anodes of the anti-serial diodes when switching the transmitting-receiving diplexer from transmission to reception or vice-versa.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
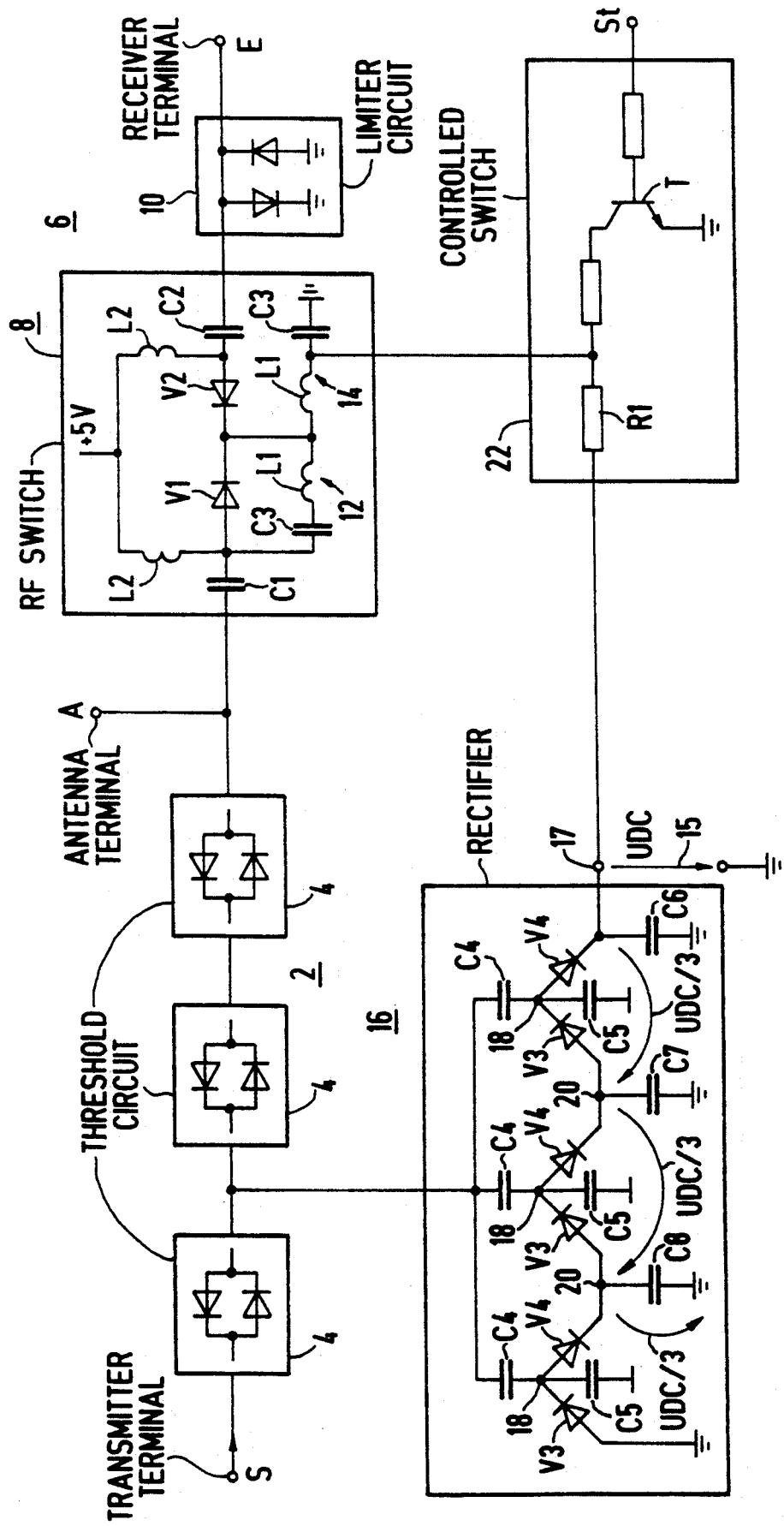
FIG. 1 is a schematic circuit diagram of a transmitting-receiving diplexer having a rectifier constructed as a voltage multiplier, whereby the stages are connected such that the DC voltages of all stages have a common reference potential.
Figure 2:
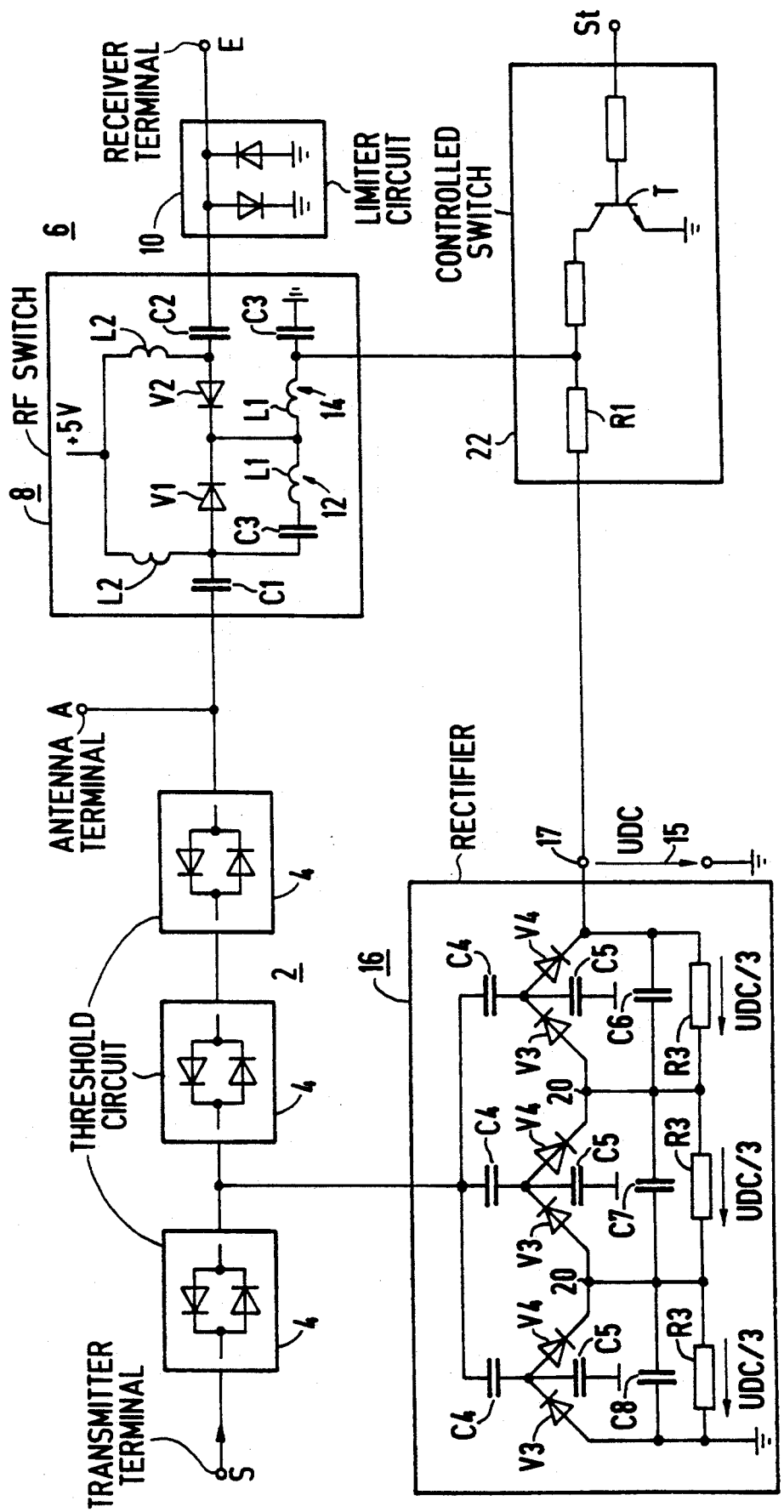
FIG. 2 is a schematic representation of a transmitting-receiving diplexer similar to that of FIG. 1; however, the DC voltage of the single stage is referred to the reference potential and the DC voltages of all stages add up to form the overall blocking voltage.

A transmitting-receiving diplexer is illustrated in FIGS. 1 and 2 and is specifically adapted for utilization in a medical nuclear magnetic resonance apparatus. It allows broadband transmission pulses having a frequency range of approximately 10-90 MHz, i.e. a bandwidth of 80 MHz, to be forwarded to an antenna given a pulse power of approximately 15 KW. The transmission terminal is referenced S, the antenna terminal is referenced A and the receiver terminal is referenced E. A control input St is provided for switching the transmitting-receiving diplexer to the transmission mode or to the receiving mode, in alternation. Three threshold circuits 4 are arranged in series in the transmitting channel 2 between the transmission terminal S and the antenna terminal A. These threshold circuits 4 are essentially composed of diodes connected in an antiparallel fashion. An RF switch 8 is arranged in the receiving channel 6 between the antenna terminal A and the receiving terminal E. In the transmission mode, it prevents the transmission signal from proceeding to the receiver terminal E and, in a receiving mode, sees to it that the received signal is forwarded from the antenna to the receiver as undisturbed as possible. Remnants of the transmission signal are dissipated to the reference potential in a limiter circuit 10.

The RF switch 8 comprises two opposite polarity serially-connected PIN diodes V1 and V2 that have their cathodes connected to one another. The RF switch 8 further comprises two coupling capacitors C1 and C2, connected in series with the diodes V1 and V2, these coupling capacitors C1 and C2 decoupling the PIN diodes V1 and V2 from the antenna terminal A or, respectively, from the receiver terminal E in terms of DC voltage. To this end, the coupling capacitor C1 is connected to the antenna terminal A and to the anode of the PIN diode V1 and the coupling capacitor 2 is connected to the receiver terminal E and to the anode of the PIN diode V2.

Two filter elements 12 and 14 are provided for the uniform distribution of the radio-frequency transmission voltage onto the two inhibited PIN diodes V1 and V2. Each filter element is composed of a series circuit of a capacitor and an inductor. The first filter element 12 includes a capacitor C3 and an inductor L1 and is connected in parallel to the PIN diode V1, whereby the second filter element 14 comprises a capacitor C3 and an inductor L1 which, as connected in series, are connected between the cathode of the diode V2 and the reference potential, here ground. The DC voltage for blocking is supplied to the RF switch 8 at a junction of the L1 with the capacitor C3 of the second filter element 14. The blocking DC voltage is positive in this case, this being illustrated by the voltage arrow 15.

The control DC voltage for activating the two PIN diodes V1 and V2 is supplied to the anodes of the two PIN diodes V1 and V2 via a respective inductor L2. The two inductors L2 decouple the voltage source that is intended to supply the control current from the receiving channel 6 in terms of radio frequency. The control current for the PIN diodes V1 and V2 lies on the order of magnitude of approximately 200 mA.

The blocking voltage for the RF switch 8 in the receiving channel is generated from the transmission signal. To this end, a rectifier 16 is connected to the transmitting channel 2 between the first threshold circuit 4 and the second threshold circuit 4. The two threshold circuits 4 are therefore arranged between the terminal point of the rectifier 16 and the antenna terminal A. The rectifier 16 comprises a three-stage voltage multiplier circuit that is also known under the name of a Greinacher circuit or a Delon circuit.

The transmission signal voltage is supplied to the individual stages of the voltage multiplier circuit of the rectifier 16 via a respective capacitive voltage divider that is composed of a series circuit of a capacitor C4 with a capacitor C5. The voltage divider composed of the capacitor C4 and the capacitor C5 delivers only approximately 1/6 of the transmission signal voltage to the individual stages. The capacitance of the capacitor C4 is, for example, 2 pF, whereas the capacitance of the capacitor C5 is, for example, 10 pF. The terminal point of the individual stages of the voltage multiplier is the respective junction 18 between the capacitor C4 and C5. The voltage multiplier circuit is used in combination with the voltage dividers in order to limit the high dissipated power in the rectifier diodes of the rectifier caused by the radio-frequency signal.

Two rectifier diodes V3 and V4 are provided in each stage and are connected to each terminal point or junction 18, whereby the rectifier diode V3 has its cathode connected to the terminal point 18 and the rectifier diodes V3 and V4 of the individual stages are then connected to one another such that they form a series circuit wherein the rectifier diodes V3 and V4 are all directed in the same direction between the reference potential and a terminal 17. The diode chain comprises two junctions 20 at which the three stages of the voltage multiplier are connected to one another and also comprises the as-yet unconnected terminal points of an anode of the rectifier V3 and of a cathode of a rectifier V4. Since the transmitting-receiving diplexer is constructed such that a positive voltage inhibits the diodes V1 and V2 in the RF switch 8, the output 17 of the rectifier 16 is connected to the free cathode of a diode V4 of the diode chain composed of the six rectifier diodes V3 and V4, whereas the reference potential is connected to the as-yet free anode of the diode V3 of the diode chain.

Each stage of the voltage multiplier has the filter capacitor C6 or, respectively, C7 or, respectively, C8 allocated thereto. The embodiments of FIGS. 1 and 2 differ only due to the arrangement of the filter capacitors C6, C7, C8 of the individual rectifier stages. In FIG. 1, the first filter capacitor C6 is connected to the output 17 of the rectifier 16 and from there to ground. The capacitor filter C7 is connected to a junction 20 between the second and third stages and the filter capacitor C8 is likewise connected to a junction 20 between the first and second stages. All of the filter capacitors C6, C7 and C8 have their other terminal connected to the reference potential. The capacitor C6, C7 and C8 have a capacitance of, for example, 33 pF.

In the steady stage, the DC voltages in the rectifier 16 distribute onto the filter capacitor C6, C7 and C8 in the following manner. The full DC voltage UDC is applied at the filter capacitor C6 at the output side; the voltage ⅔ UDC is applied at the filter capacitor C7 between the second and third stages; and the voltage ⅓ UDC is applied at the filter capacitor C8 between the first and second stages. The voltage ⅓ UDC is therefore respectively applied by way of the two rectifier diodes V3 and V4 of a stage, i.e. the blocking voltage load and, therefore, the off-state power loss in a multi-stage rectifier is lower in accordance with the number of stages than in a single-stage rectifier for the same output voltage.

In FIG. 2, in contrast to the structure of FIG. 1, the filter capacitors C6, C7 and C8 are connected to one another such that the voltage of the filter capacitors C6, C7 and C8 is additive to form the overall blocking voltage. Here, the filter capacitor C8 has one terminal connected to the reference potential. The other terminal of the capacitor C8 is connected to the first junction 20 between the first and second stages of the rectifier 16. In series with the filter capacitor C8, the filter capacitor C7 is connected to the junction 20 between the first and second stages and to the junction 20 between the second and third stages. The third filter capacitor C6 is connected to the junction 20 between the second and third stages and the output 17 of the rectifier 16. In other words, three filter capacitors are now connected in series between the output of the rectifier and the reference potential, each of these filter capacitors having a voltage of ⅓ UDC in the steady state. For DC voltage balancing, a resistor R3 is respectively connected in parallel to each filter capacitor C6, C7 and C8. The circuit of the rectifier 16 of FIG. 2 is advantageous when the filter capacitor C6, C7 and C8, whose voltage load is not as high are selected for the rectifier 16.

In both FIG. 1 and FIG. 2, the DC voltage UDC supplied by the rectifier 16 is forwarded to the PIN diodes V1 and V2 in the RF switch 8 in the same manner via a controlled switch 22. When, via a corresponding control signal, the transistor T in the control switch 22 is placed into its inhibited condition, then the voltage supplied by the rectifier 16 is applied to the RF switch 8 via a resistor R1. When, in the receiving mode, the blocking voltage is then to be disconnected from the RF switch 8, the control signal at the input of the controlled switch 22 is varied such that the transistor T is conductive. As a result thereof, first of all, the blocking voltage for the RF switch 8 is lowered merely to the reference potential and, secondly, the two PIN diodes V1 and V2 are charged with a control current from the 5 V voltage source.

It should be particularly pointed out that the division of work between the PIN diodes V1 and V2 in the RF switch 8 and the rectifiers V4 and V5 in the rectifier 16 is extremely advantageous. Although the diodes V1 and V2 are slow, they have a low impedance in the on condition, i.e. do not greatly attenuate the received signal. By contrast, the rectifier diodes V3 and V4 are fast switching diodes that have a high blocking voltage.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A radio-frequency transmitting-receiving diplexer, comprising:
    a radio-frequency switch between an antenna terminal and a receiver terminal, said radio-frequency switch including first and second PIN diodes connected in series with one another via a junction and poled in opposition to one another;
    a rectifier including means for supplying a blocking voltage to said first and second PIN diodes;
    a control switch controllably connecting said blocking voltage to said first and second PIN diodes;
    a pair of coupling capacitors respectively couple said radio-frequency switch to said antenna terminal and to said receiver terminal;
    a first filter element including a series circuit of an inductor and a capacitor connected in parallel to said first PIN diode of said radio-frequency switch;
    a second filter element including a series circuit of an inductor and a capacitor connected in parallel to said second PIN diode of said radio-frequency switch;
    said inductors of said first and second filter elements connected together and to said junction of said first and second PIN diodes; and
    said inductor of said second filter element connected to said rectifier via said control switch.

2. The radio-frequency transmitting-receiving diplexer of claim 1, wherein:
    said first and second PIN diodes are each connected to one another at their cathodes; and
    said rectifier comprises means for supplying a positive blocking voltage to said cathodes.

3. The radio-frequency transmitting-receiving diplexer of claim 1, wherein:
    said radio-frequency switch includes means for supplying a control current to said first and second PIN diodes upon receipt of a transmitted signal to cause conduction of said first and second PIN diodes.

* * * * *